(12) United States Patent
Ellison et al.

(10) Patent No.: US 6,557,087 B1
(45) Date of Patent: Apr. 29, 2003

(54) MANAGEMENT OF PCI READ ACCESS TO A CENTRAL RESOURCE

(75) Inventors: Russell Lee Ellison, Corona de Tucson, AZ (US); Joseph Smith Hyde, II, Tucson, AZ (US); Juan Antonio Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,505

(22) Filed: Feb. 22, 2000

(51) Int. Cl.[7] .............................................. G06F 13/00
(52) U.S. Cl. ......................... 711/154; 711/151; 711/211
(58) Field of Search ................................ 711/151, 154, 711/211

(56) References Cited

U.S. PATENT DOCUMENTS

| | | | |
|---|---|---|---|
| 5,455,915 A | * 10/1995 | Coke | 370/462 |
| 5,471,590 A | * 11/1995 | Melo et al. | 340/825.5 |
| 5,550,989 A | 8/1996 | Santos | 395/306 |
| 5,797,020 A | * 8/1998 | Bonella et al. | 710/107 |
| 5,809,534 A | * 9/1998 | Elkhoury | 711/142 |
| 5,862,403 A | 1/1999 | Kanai et al. | 395/826 |
| 5,903,906 A | * 5/1999 | Pettey | 711/118 |
| 5,933,158 A | 8/1999 | Santos et al. | 345/516 |
| 5,936,640 A | 8/1999 | Horan et al. | 345/501 |

* cited by examiner

Primary Examiner—Reba I. Elmore
(74) Attorney, Agent, or Firm—John H. Holcombe

(57) ABSTRACT

A PCI read access management system and method to manage read access between two agents providing PCI read requests to conduct contiguous read operations to a central resource at a PCI bus. Dual transaction control logic units are each respectively coupled to a separate one of the agents. An arbitration request connection couples the dual transaction control logic units. A PCI read request by one of the agents (e.g., agent A), and recognized by one of the dual transaction control logic units (e.g., unit 1), is signaled to the arbitration request connection, which arbitrates between the transaction control logic units for reserving the PCI bus for the one agent (agent A), and the one transaction control logic unit (unit 1) provides read access to the PCI bus for the one agent (agent A) for the contiguous read operations. The one transaction control logic unit (unit 1) then maintains the reservation until completion of the contiguous read operations.

21 Claims, 4 Drawing Sheets

MANAGEMENT OF PCI READ ACCESS TO A CENTRAL RESOURCE

DOCUMENTS INCORPORATED BY REFERENCE

Commonly assigned U.S. patent application Ser. No. 09/275,610, filed Mar. 24, 1999, now U.S. Pat. No. 6,286,074, is incorporated for its showing of a PCI (Peripheral Component Interconnect) bus bridge system for processing requests from multiple agents.

FIELD OF THE INVENTION

This invention relates to the processing of read commands in a PCI bus system, and, more particularly, the management of PCI read requests to conduct contiguous read operations which may require multiple transmissions of data.

BACKGROUND OF THE INVENTION

The Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '074 U.S. Patent describes an example of a complex PCI bus system for providing a connection path between a secondary PCI bus, to which are attached a plurality of hosts, and at least one primary PCI bus, to which are attached a plurality of peripheral devices. The incorporated '074 U.S. Patent additionally defines many of the terms employed herein, and such definitions are also available from publications provided by the PCI Special Interest Group, and will not be repeated here.

Computer system data storage controllers may employ PCI bus systems to provide fast data storage from hosts, such as network servers, via channel adapters and the PCI bus system, to attached data storage servers having storage devices, cache storage, or non-volatile cache storage.

A channel adapter (an adapter coupling a host system to a secondary PCI bus) attempts to read large amounts of data at once from the primary PCI bus, such as 4K bytes of data, and a remote transaction control prefetches the data stream, breaking the data stream into 512 byte groups, as discussed in the incorporated '074 U.S. Patent. In a typical PCI bus protocol, a local prefetch engine of a central resource at the primary PCI bus accesses and prefetches each group of data, usually in "tracks" or "cache lines" of an expected length, such as 128 bytes, continuously in a single read operation, or by contiguous read operations in a DMA (direct memory access) process to a PCI bus adapter of the local bridge. However, if the device supplying the data is unable to fill the read request by accessing the entire 512 bytes in a continuous operation, and another local bridge PCI bus adapter provides a request for the same primary PCI bus, the central resource may flush the read operation and start the new request. For example, the local prefetch read request may be for read bursts starting at a PCI address "x" and read 128 bytes of data. Then, the next PCI bursts resume reading at a PCI address "x+128". However, if the first read runs out of data and pauses, another read command is given access due to the fairness algorithm of the central resource, the other read operation starting at address "y". The first read prefetch will thus be slowed, and may be unable to complete. The total amount of requested data for the original read command will thus not have been provided. Since not all of the data has been provided, the prefetch of the central resource may restart and reaccess the same data and go through the same process until all of the data has finally been read, and the requests may again be interrupted by other read commands. Alternatively, another host may request access to the same primary PCI bus at an alternate channel adapter, so that the primary PCI bus is requested again via a remote path, with the requests continually interrupting each other.

A latency timer has been employed to limit the burst size where the target device cannot satisfy the entire read request and allows the primary PCI bus to be switched to the next agent's command, while only transferring the data received before the latency timer expired. Again, this results in a need for subsequent read requests, which require repeating the same process until the data has finally been read.

Thus, however conducted, the time required to complete a typical read operation of contiguous data, of, e.g. 512 bytes, in a series of discontinuous read operations, in the context of competing read commands, is thus very lengthy and has the effect of reducing the efficiency of the read operation and reducing the effective bandwidth of the PCI bus system during the discontinuous read operations.

SUMMARY OF THE INVENTION

An object of the present invention is to increase the efficiency of read operations of contiguous data in a PCI bus system, and to lead to a higher effective read bandwidth for the PCI bus system.

In a PCI bus system having at least a primary PCI bus, a PCI read access management system and method are provided for managing read access between two agents providing PCI read requests to conduct contiguous read operations of the central resource at the PCI bus. Dual transaction control logic units are each respectively coupled to a separate one of the requesting agents. An arbitration request connection is provided, coupling the dual transaction control logic units. A PCI read request by one of the agents (e.g., agent A), and recognized by one of the dual transaction control logic units (e.g., unit 1), to the arbitration request connection, which arbitrates between the transaction control logic units for reserving the primary PCI bus for the one agent (agent A), and the one transaction control logic unit (unit 1) grants read access to the primary PCI bus for the one agent (agent A) for the contiguous read operations. The one transaction control logic unit (unit 1) then maintains the reservation by signaling the arbitration request connection until completion of the contiguous read operations.

The reservation is accomplished by the other transaction control logic unit blocking the other agent, preventing it from asserting its request lines at the primary PCI bus, such as by preventing issuance of a grant signal.

The completion of contiguous read operations is identified by the transfer of data read at the primary PCI bus during the contiguous read operations equaling an established byte count, e.g., 512 bytes.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
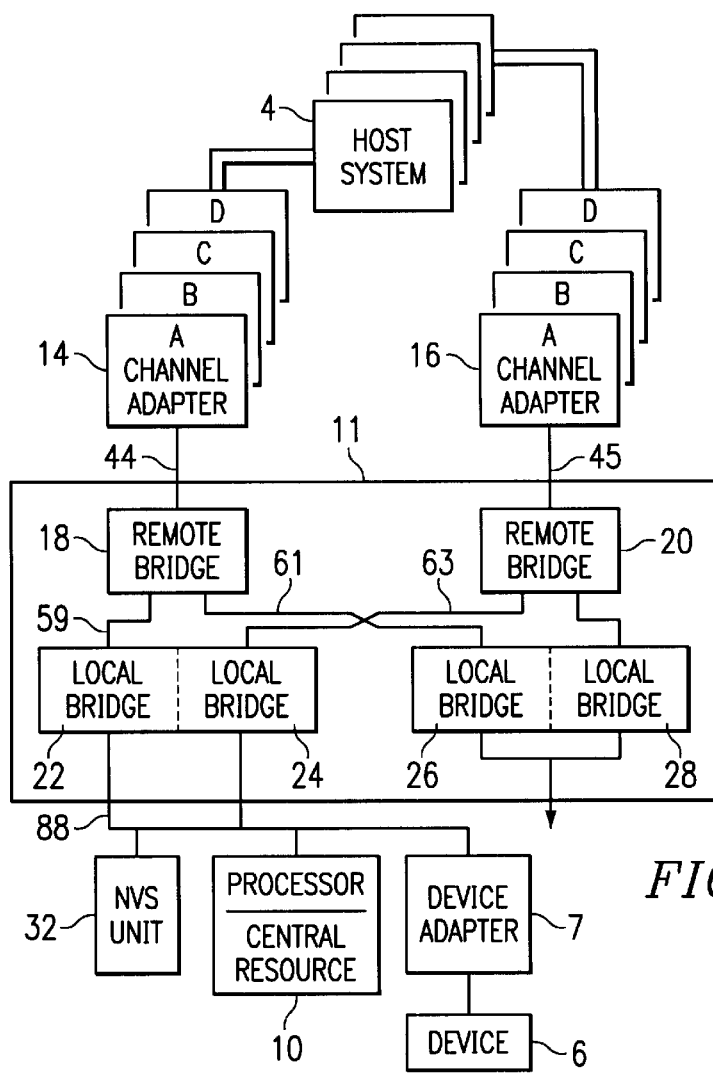
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as a processor 10, a device adapter 7 coupled to a device 6, and an NVS (non-volatile store) unit 32. The exemplary PCI bus system 11 is based upon that illustrated in the incorporated '074 U.S. Patent, employing similar components, modified in accordance with the present invention. As discussed in the incorporated '074 U.S. Patent, the device 6 may comprise an direct access storage device subsystem, such as a string of DASDs.

The PCI bus system 11 allows the host systems 4 to communicate with the processor 10, and other processors (not shown) which may be on the same bus system, employing adapters 14A, B, C and D, adapters 16A, B, C and D, or other communication elements (not shown), including any device that typically communicates over a PCI bus. The channel adapters 14 and 16 may comprise channel adapter cards that are each connected via a slot on the PCI bus system to a remote bridge 18 or remote bridge 20 of the PCI bus system 11. Each channel adapter card provides a connection to one or more host systems 4 at a secondary PCI bus 44 or 45. Briefly, processor 10 comprises a central resource that controls the primary bus 88, providing addresses for access by the channel adapter 14, 16.

The two remote bridges 18, 20 may be coupled to different sets of channel adapters or other communication elements, and each remote bridge is coupled to local bridges. Thus, remote bridge 18 is coupled to local bridges 22, 26, and remote bridge 20 is coupled to local bridges 24, 28. In the example of FIG. 1, the local bridges 22–24 may communicate with processor 10, device adapter 7, and NVS unit 32 on primary PCI bus 88, although other arrangements may be envisioned by those of skill in the art. Thus, in the present example of a PCI bus system, either the channel adapters 14A–D or the channel adapters 16A–D may communicate with the processor 10, device adapter 7, or NVS unit 32 over the PCI bus system 11.

Important communications in a PCI bus system are the writing and reading of data by a host system 4 to or from the NVS unit 32 and to or from a device 6, the data stored in the selected unit or device under the control of the processor 10. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. The incorporated '074 U.S. Patent describes an example of a PCI bus system for providing a connection path between a secondary PCI bus 44 or secondary PCI bus 45, to which are attached a plurality of host systems 4, and at least one primary PCI bus 88, to which are attached one or more computer system data storage controllers, such as processor 10. The computer system data storage controllers employ the PCI bus system to provide fast write data storage from the hosts. In so doing, read access to the data is significantly slower than writes in PCI bus systems.

In PCI bus systems, the channel adapters 14 and 16 perform PCI write commands and PCI read commands to transfer data to their destinations. As discussed above with respect to the background of the invention, a channel adapter or remote transaction control attempts to read large amounts of data at once from a device attached to the primary PCI bus, e.g., as a number of 512 byte groups. The central resource may attempt to supply the requested data in a local prefetch operation to supply each 512 byte group. However, if the device supplying the data is unable to fill the data prefetch request in a continuous operation, and another read request is received at the same primary PCI bus, the central resource may flush the first read operation and start the new request. Thus, however conducted, the time required to complete a typical read operation of contiguous data in a series of discontinuous read operations is very lengthy and has the effect of reducing the efficiency of the read operation and reducing the effective bandwidth of the PCI bus system during the discontinuous read operations.

Figure 2:
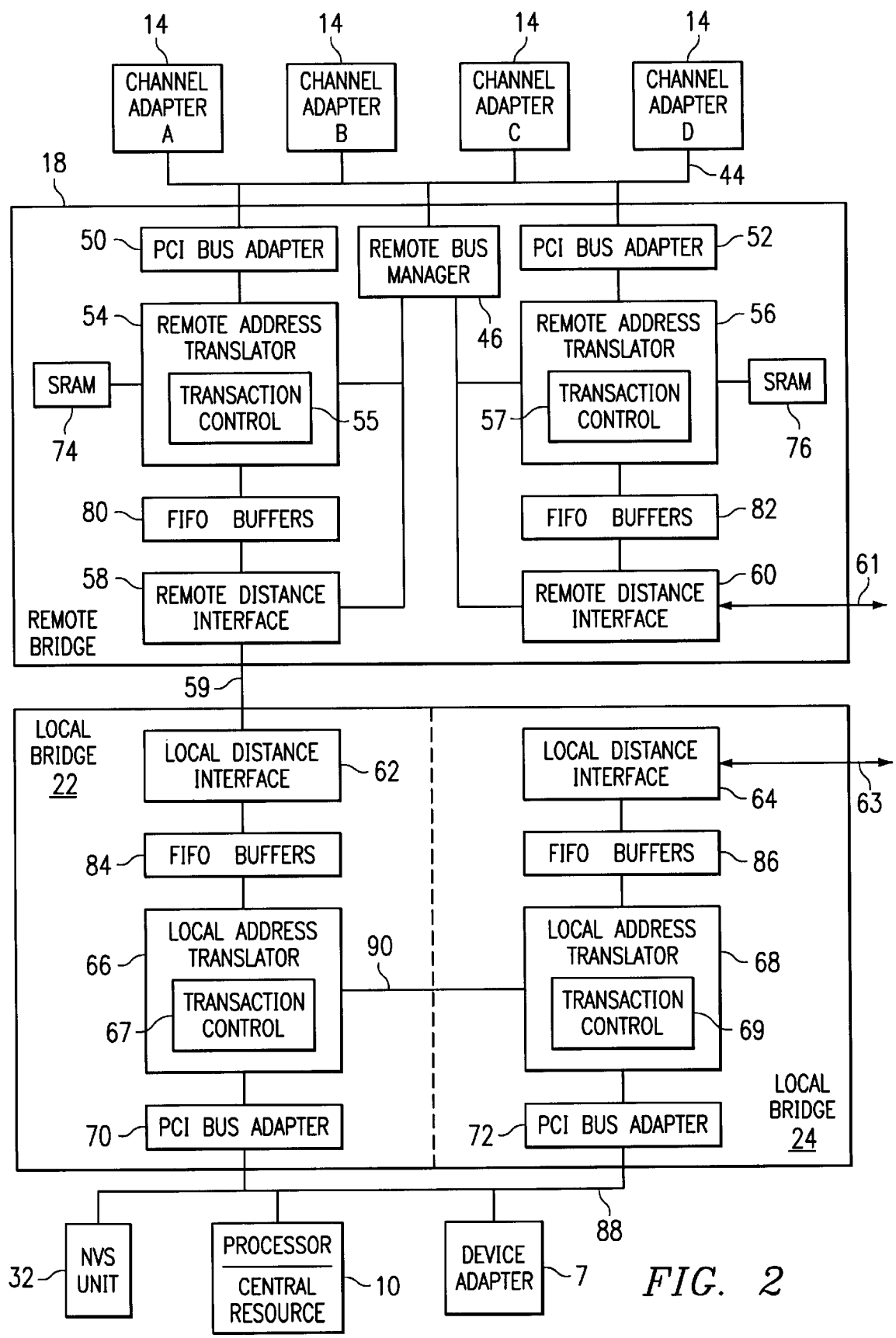
FIG. 2 is a block diagram of the PCI bus system of FIG. 1 illustrating a remote bridge and illustrating an embodiment of the present invention with two coupled local bridges mounted on the same board.

Referring additionally to FIG. 2, further detail of one-half of the exemplary PCI bridge system of FIG. 1 is illustrated. As discussed in the incorporated '074 U.S. Patent, PCI systems typically employ arbitration between commands from the attached channel adapters on the secondary bus to manage the usage of the bus system in an efficient manner. In the example of FIG. 2, the arbitration is conducted by a remote bus manager 46. Typically, a PCI remote bus manager 46 selects the commands from the channel adapters 14A–D on initiating PCI bus 44 in a round-robin fashion. An element of the architecture of PCI bus systems is that read operations require time for the command to pass through the bus system, time to access the data at the source of the data, and time for passage of the data back through the bus system. Therefore, PCI read commands are extremely slow operations to complete, especially if the operations are repeatedly interrupted, as discussed above.

The exemplary PCI bus system of FIG. 2 includes the PCI remote bus manager 46 which manages data and signals presented on the secondary PCI bus 44, and processor 10 which manages data and signals presented on the PCI bus 88. The PCI bus manager 46 manages the bus arbitration discussed above, bus parking, and other bus management functions, preferably with standalone circuitry. The bus manager 46 has information describing the address ranges of remote PCI bus adapters 50 and 52 and uses this information to determine which remote PCI bus adapter is targeted by a PCI operation. The information on the address ranges is preferably written to registers in the bus manager 46. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14 and local bridge 22, via distance connection 59. The PCI bus adapter 52, remote address translator 56, transaction control 57, and remote distance interface 60 provide communication between channel adapters 14 and local bridge 26, via distance connection 61. The channel adapters 14A, B, C, D communicate with either PCI bus adapter 50 or 52 via the PCI bus 44. The PCI bus adapters 50, 52 may comprise PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over distance connections 59, 61. The remote bridge 20 may be the same or similar to the remote bridge 18, and provides communication with the local bridges 24, 28.

Each local bridge 22, 24 comprises, respectively, a local distance interface 62, 64, a local address translator 66, 68, a transaction control 67, 69, and a PCI bus adapter 70, 72. The remote 54, 56 and local 66, 68 address translators include circuitry known in the art to map a received address to another address space. Remote address translator 54, and the corresponding remote address translator of remote bridge 20, perform address translation operations by mapping an address provided by channel adapters 14 or 16 to the address space of the local PCI bus adapters 70, 72, respectively. Local address translators 66, 68 map an address from the local PCI bus adapters 70, 72 to the remote PCI bus adapter 50 address space, or the PCI bus adapter address space of the corresponding remote bridge 20, such that this translated address is transmitted to the remote address translator 54, or the corresponding remote address translator of remote bridge 20, via the local 62, 64 and remote distance interfaces. In such case, the remote address translator 54, or the corresponding remote address translator of remote bridge 20, may buffer and transmit this received address to the remote PCI bus adapters. Similarly, after remote address translator 54, or the corresponding remote address translator of remote bridge 20, translates an address received from the remote PCI bus adapter to the address space of the local PCI bus adapter 70, or the corresponding local PCI bus adapter of remote bridge 20, respectively, this translated address is transmitted to the local address translator 66, 68 via the remote and local distance interfaces, via distance connections 59, 63. In such case, the local address translator 66, 68 may buffer and transmit this received address to the local PCI bus adapter 70, 72.

The FIFO (first-in, first-out) buffer sections 80, 82, 84, and 86, queue the read/write transactions for the PCI bus system 11. Each of the FIFO buffer sections comprises multiple FIFO buffers to queue the transaction from the channel adapters 14A, B, C, D or from the channel adapters 16A, B, C, D, and the processor 10. The address translators 54, 56, 66, and 68 include transaction control circuitry 55, 57, 67, and 69 that includes logic to select queues in the FIFO buffers 80, 82, 84, and 86 to place a transaction and manage the flow of transactions.

The processor 10 comprises the central resource function for controlling access to primary bus 88, and provides the address ranges for devices and for the local bridges attached to the primary bus 88. Address ranges for the channel adapters 14, 16 and other agents in the PCI bus system are also controlled by processor 10. A local prefetch engine of the central resource function controls prefetching lines of data at the primary bus 88 by the PCI bus adapters 70, 72 for assembly of groups of data into a block prefetched under the control of PCI remote bus manager 46.

The PCI busses 44 and 88 are designed for only very short distances, measured substantially in inches, and small loads, and the distance connections 59, 61, 63 are designed for longer distances with greater loads.

In accordance with the present invention, the local bridge 22 and local bridge 24 are coupled, and may be mounted on the same board or card, for ease of coupling. The local bridges 22, 24 are coupled by an arbitration request connection 90, and communicate through the same central resource.

A central resource, e.g., of processor 10, provides local prefetch of data. For example, a transaction control 55, 57 may read (as a part of a remote prefetch operation) a series of groups of data, such as 512 byte groups. When a read is asserted at a PCI bus adapter 70, 72 by the transaction control 55, 57, the central resource allows the PCI bus adapter to access the primary bus 88 for the prefetch operation. The data will be read in a series of lines or tracks, e.g. of 128 bytes, as provided by the device accessed from the bus. In an environment of competing read requests, the PCI bus adapter 70, 72 is selected in a round robin fashion by the central resource of processor 10.

The central resource also has a fairness algorithm to prevent any one agent on the bus from monopolizing the bus for an extended period, if there is another competing read request. Thus, should a pause or wait occur in the prefetch operation, the central resource grants access to a competing read, also establishing a prefetch operation for the competing read, and flushes the remainder of the original read prefetch.

Figure 3:
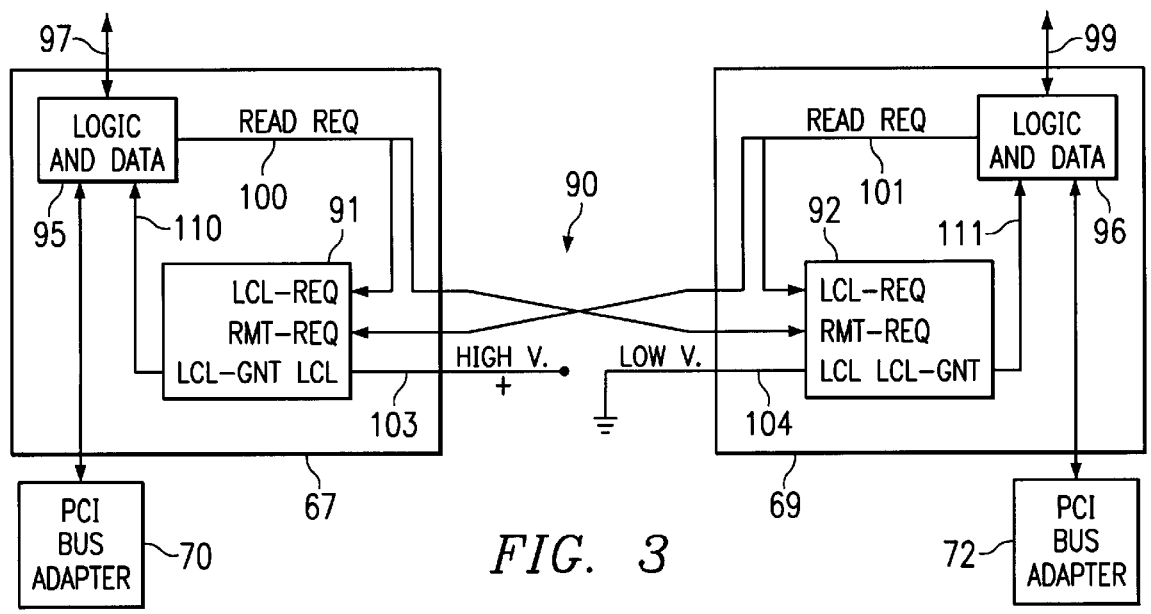
FIG. 3 is a block diagram of an embodiment of transaction controls of the local bridges of FIG. 2, and an arbitration request connection coupling between the transaction controls in accordance with an embodiment of the present invention.

FIG. 3 illustrates an example of transaction controls 67 and 69 of local bridges 22 and 24 of FIGS. 1 and 2, with the coupled PCI bus adapters 70 and 72. The transaction controls 67 and 69 may comprise those of the incorporated '074 U.S. Patent, modified with an arbitration request connection 90 and arbitration logic signal circuits 91 and 92. Logic and data handling modules 95 and 96 control the progression of transactions and any associated data between the local distance interfaces 62, 64, the FIFO buffers 84, 86, and the PCI bus adapters 70, 72, with the addressing controlled by the local address translators 66, 68.

The logic and data handling module 95, 96, if not busy, recognizes a PCI read request sent by one of the channel adapters 14A–D, 16A–D over the associated remote bridge 18, 20 and distance connection 59, 63, received at input 97, 99.

The arbitration request connection 90 comprises connection 100 coupling logic and data handling module 95 to a local request input of arbitration logic signal circuit 91 and a remote request input of arbitration logic signal circuit 92, and connection 101 coupling logic and data handling module 96 to a local request input of arbitration logic signal circuit 92 and a remote request input of arbitration logic signal circuit 91.

A logic and data handling module 95, 96, upon recognizing a PCI read request, provides a read request signal on connection 100, 101 to the coupled local request input and to the coupled remote request input of the arbitration logic signal circuits 91, 92. The respective circuits are identified by different applied voltages at inputs 103 and 104, for example, circuit 103 has a signal of a positive voltage, and circuit 104 has a signal of a negative voltage or ground.

If only one of the logic and data modules 95 or 96 provides a read request signal at the local request input 100 or 101, the corresponding arbitration logic signal circuit 91 or 92 will provide a local grant signal on a connection 110, 111 to the logic and data module. In the event that both logic and data modules 95 and 96 provide read request signals at local request inputs 100 and 101, the voltage inputs 103 and 104 control a predetermined arbitration, e.g. in which the high voltage wins. Alternatively, a busy signal or a rotational priority may be employed to determine the arbitration. Thus, the local grant is supplied by arbitration logic signal circuit 91 to logic and data module 95. So long as a read request signal is applied at the local request input 100 or 101, the corresponding logic signal circuit 91 or 92 provides a local grant, and the other logic signal circuit is prevented from providing a local grant at its connection 111 or 110, thereby effectively blocking any agent coupled to the other logic and data module. So long as the original read request signal is applied by the originally granted logic and data module 95, 96, any subsequent read request signal at the other connection will be ignored. Only after the original read request signal is dropped on connection 100 or 101 by the originally granted logic and data module 95 or 96, will the read request signal at the other connection be granted. A delay may be built into logic and data module 95 to prevent prompt assertion of a new read request at connection 100, and to allow logic and data module 96 to provide a read request signal at input 101, and thereby allow the transaction controls 67 and 69 to alternate between read operations.

When a contiguous read operation is granted, the logic and control 95, 96 of the transaction control 67, 69 sets up the coupled PCI bus adapter 70, 72 to do a DMA read operation at the primary PCI bus. Referring additionally to FIG. 2, the central resource of processor 10 responds to the read request, setting up the prefetch operation by the PCI bus adapter. The arbitration logic signal circuits will effectively maintain the read access of the granted transaction control 67, 69 by means of the grant signal at the corresponding connection 110, 111, and block read access of the other transaction control by not providing a grant signal.

Thus, a read request from a remote bridge at distance connection 59, 63 and provided to the corresponding transaction control 67, 69 results in the logic and data handling module 95, 96 providing a read request signal at its connection 100, 101. The corresponding local arbitration logic signal circuit will supply a local grant signal at connection 110, 111 to the logic and data handling module 95, 96. The logic and data handling module then begins the contiguous read operations, transmitting the first of the read commands to set up the PCI bus adapter 70, 72.

The logic and data handling module 95, 96, in accordance with the present invention, maintains the read request signal on connection 100, 101 of the arbitration request connection 90 while the contiguous read commands are issued and completed. The logic and data handling module 95, 96 sets up the PCI bus adapter 70, 72 to maintain an established byte count and the PCI bus adapter counts the data which has been read. As an example, the length of data to be read is communicated to the PCI bus adapter, and may, for example, comprise 128 bytes for each of the contiguous reads. When the established byte count of data has been read (for example, 512 bytes), the PCI bus adapter causes the logic and data handling module 95, 96 to drop the read request signal on connection 100, 101.

During the time that the read request signal is present at the remote request input of the remote arbitration logic signal circuit 91, 92, any read requests. by the associated logic and data handling circuit is blocked by preventing a grant signal at the local grant output. Thus, a competing channel adapter 14–16 is blocked from interrupting the contiguous read operations. As an alternative, the local grant output 110-111 may provide a busy signal to the associated logic and data handling module 95, 96 so that the module will provide a busy signal regarding any read transaction from interrupting the contiguous read operations.

Upon the logic and data handling module dropping the read request signal, the originally granted arbitration logic signal circuit 91, 92 drops the local grant at connection 110, 111, preventing any additional read operations. The other arbitration logic signal circuit 91, 92 will enable its local grant, so that any immediately following read request from its local logic and data handling module will be granted at connection 110, 111, if the request is active. Also, as discussed above, the originally granting arbitration logic signal circuit 91, 92 may delay any further grant, or alternatively the local logic and data handling module may delay providing any subsequent read request on connection 110, 111, thereby insuring that read requests will alternate between the local bridges 22 and 24 if they are both receiving read commands.

Figure 4:
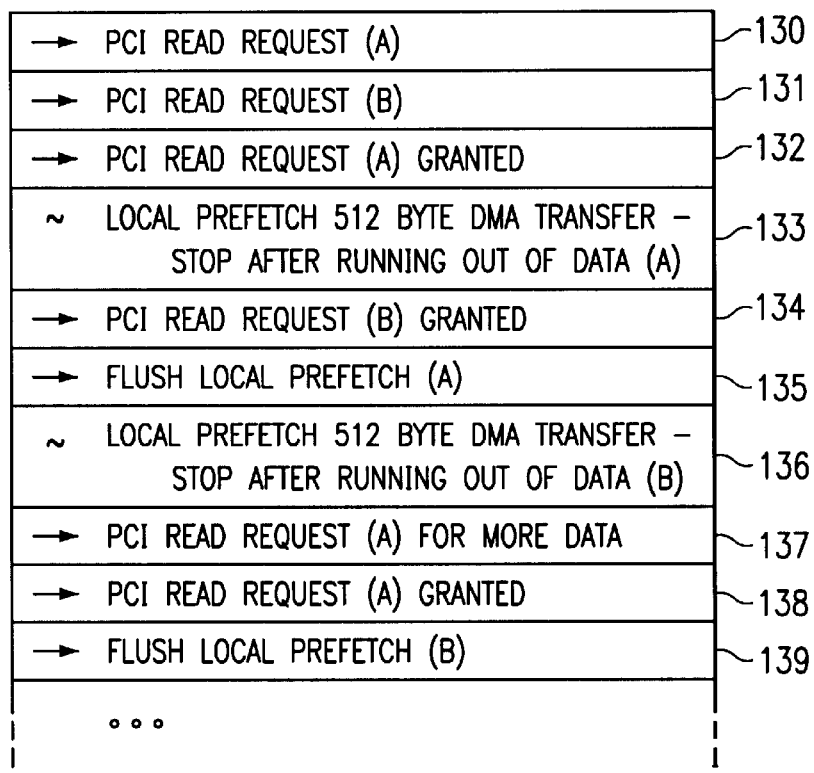
FIG. 4 is a diagrammatic representation of a prior art sequence of operations for reading data.

FIG. 4 illustrates an example of the sequence of commands with a prior art PCI bridge system having commands at two of the input channel adapters and employing two local bridges communicating at the primary PCI bus. In operation 130, one of the channel adapters provides a PCI read request (A). Then, in operation 131, another of the channel adapters provides a read request (B). In operation 132, the first read request (A) is granted, and, in operation 133, the prefetch operation is begun for direct memory access data transfer from the device at the primary PCI bus to one of the local bridges. The prefetch may be for a continuous sequence of contiguous data, e.g., 512 bytes, or may be as a contiguous series of read operations of smaller blocks of data, such as 128 bytes. However, as is typical, the device does not provide all of the data in a continuous stream, but rather stops and pauses, either during the transfer of the contiguous data or between the smaller blocks of data. If no competing command was provided, the data transfer operation may be able to continue. However, with the competing command from the other channel adapter, during the stoppage, the other request (B) is granted at operation 134, and the central resource of processor 10 flushes the present prefetch in operation 135. The other prefetch operation 136 then begins. Since the first read request (A) was not completed, the read will have to be restarted after the prefetch (B) is completed or stops. Thus, if the second prefetch stops, a continuation of the first read (A) may be asserted in step 137, and granted in step 138 with a new prefetch, while the central resource flushes the prefetch (B) in step 139. As illustrated, the process may continue to repeat.

As the result, the read requests are handled inefficiently by the PCI bus system.

Figure 5:
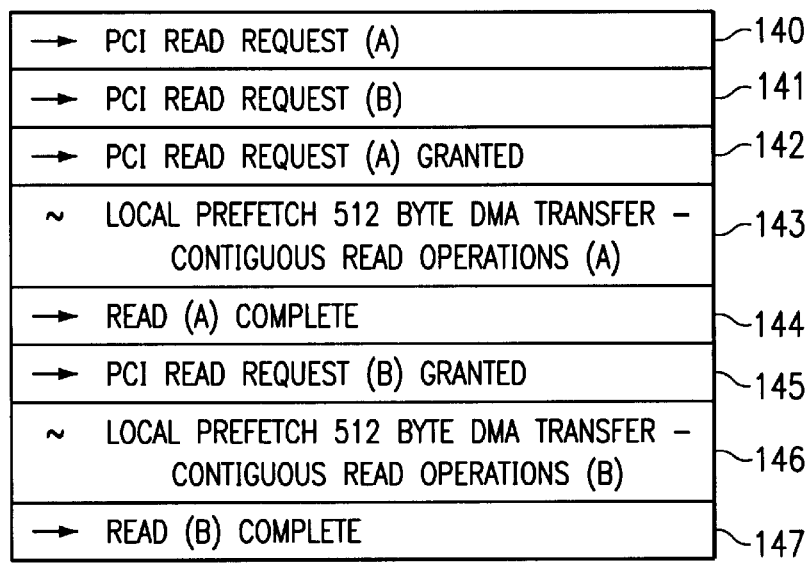
FIG. 5 is a diagrammatic representation of a sequence of operations for reading data in accordance with the PCI bus system of FIGS. 1–3.

FIG. 5 illustrates the operation of the PCI bus system of the present invention under the same circumstances. One of the channel adapters initiates a PCI read request (A) in operation 140. Then, in operation 141, another of the channel adapters provides a read request (B). In step 142, the first read request (A) is recognized and granted by the logic and data handling module, the arbitration request connection 90 and arbitration logic signal circuits 91 and 92. Thus, in operation 143, the prefetch operation (A) is begun for direct memory access data transfer from the device at the primary PCI bus to the local bridge providing the local grant at connection 110, 111. The prefetch is for contiguous data, e.g., 512 bytes, in a contiguous series of read operations of smaller blocks of data, such as 128 bytes, even though the device does not provide all of the data in a continuous stream, but rather stops and pauses between the transfer of the smaller blocks of data. During the prefetch operation, any competing command from another channel adapter is blocked by the blocking of a local grant by the other one of the arbitration logic signal circuits 91, 92. Thus, the data transfer operation is able to continue. The PCI bus adapter 70, 72 tracks the transferred data bytes and, upon the transfer of the established byte count of data, e.g., 512 bytes, the read operation is completed, as indicated by operation 144. The original local grant is dropped and the other grant may then become enabled upon a read request (B) by the other channel adapter, represented by steps 145–147.

As the result, each of the contiguous read operations is conducted at a high level of efficiency.

Figure 6:
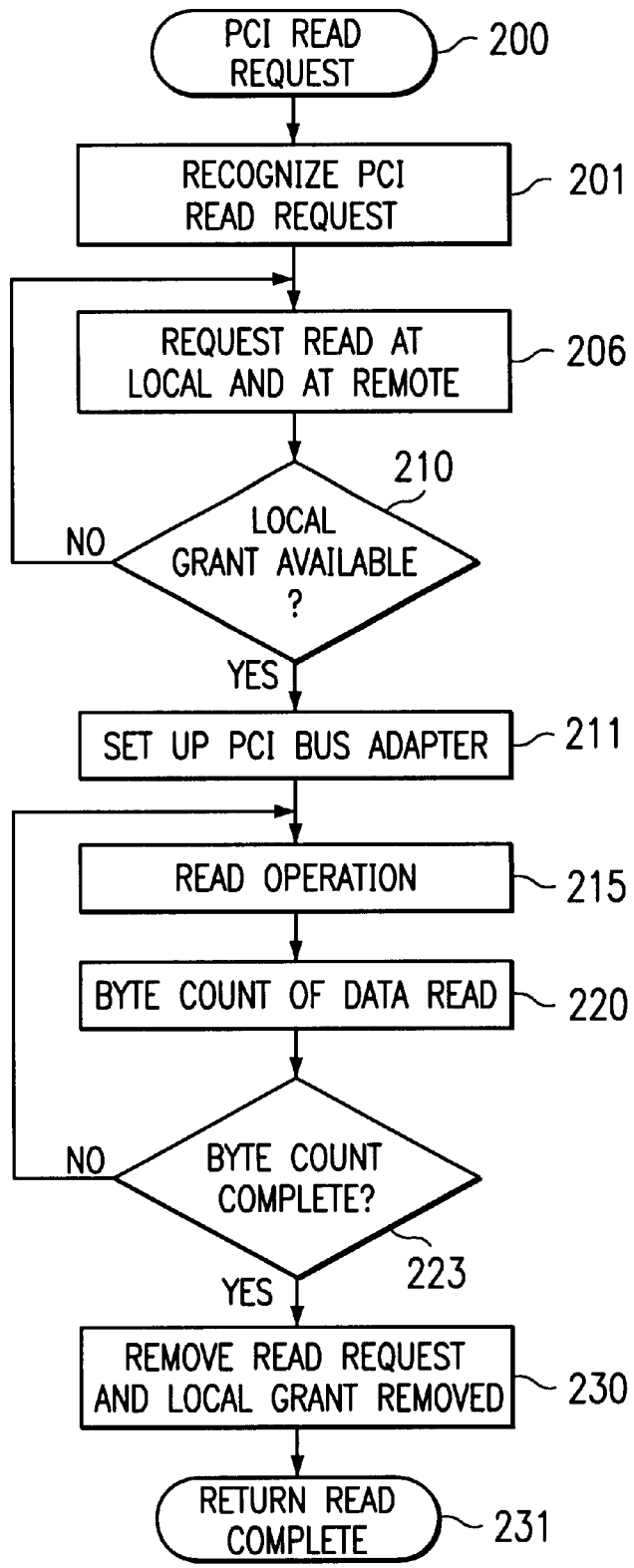
FIG. 6 is a flow chart depicting an embodiment of the method of the present invention.

An embodiment of the method of the present invention is illustrated in reference to FIG. 6, and additionally with reference to FIGS. 1–3.

In step 200, one of the channel adapters 14–16 provides a PCI read request. The logic and data handling module 95, 96 of the local bridge 22, 24 transaction control 67, 69 receiving the request, recognizes the PCI read request in step 201. The logic and data handling module provides the read request signal on the connection 100, 101 of the arbitration request connection 90, in step 206. The read request signal is respectively supplied to the coupled local request input and to the coupled remote request input of the arbitration logic signal circuits 91, 92. In, step 210, if the remote arbitration logic signal circuit 91, 92 is not currently granting a read operation, the local and remote arbitration logic signal circuits respectively grant the local grant signal at connection 110, 111, to the "local" bridge, and block the local arbitration logic signal circuit from supplying a local grant signal at connection 110, 111 to the "remote" logic and data handling module 95, 96.

Thus, in step 210, the local arbitration logic signal circuit will supply a local grant signal at connection 110, 111 to the "local" logic and data handling module 95, 96. Step 210 is essentially a test for availability by one of the arbitration logic inputs. The logic and data handling module receiving the grant then sets up the PCI bus adapter for the contiguous read operations in step 211, transmitting a transaction control request for the contiguous read commands to set up the PCI bus adapter 70, 72, which conducts the reads in step 215 in accordance with the prefetch operation.

As each of the contiguous read operations is completed, a byte count of the data is conducted, e.g., by the PCI bus adapter 70, 72 in step 220, and the byte count added to the previously indicated byte count for the contiguous read operations, if any. In step 223, the "local" PCI bus adapter 70, 72 compares the accumulated byte count to the predetermined byte count, such as 512 bytes, or alternatively decrements the byte count until it reaches "0". If the contiguous read operations have not been completed, "NO", the prefetch is allowed to continue with the next contiguous read operation in step 215.

Upon reading the entire established length of data, as indicated by the accumulated byte count of data from step 220 equalling the predetermined byte count in step 223, the contiguous read operation is complete, and step 230 resets the arbiters and the local grant, and step 231 returns a read complete to the requesting channel adapter. As an example, the "local" logic and data handling module 95, 96 drops the read request signal on the arbitration request connection 90, causing the "local" arbitration logic signal circuit 91, 92 to drop the local grant, and causing the "remote" arbitration logic signal circuit 91, 92 to enable the local grant, if requested. Thus, any previously competing contiguous read operation at the "remote" may then be enabled at the "remote" local bridge.

The contiguous read operation has therefore been conducted in an efficient manner, and any competing read operation at the other bridge will be blocked because the local grant is not asserted in step 210.

Alternative arrangements of the specific steps may be made by those of skill in the art. Further, the functions of the specific modules and circuits may be carried out by equivalent circuits or enabled logic as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system having at least one PCI bus, a method for managing access to the same PCI bus for a PCI read between two agents, said agents providing PCI read requests to conduct contiguous read operations to a central resource at said same PCI bus, said managemtn conducted at dual transaction control logic units having an arbitration request connection coupling said dual transaction control logic units, comprising the steps of:

upon recognition of a request from one of said agents for said PCI read, arbitrating, at said arbitration request connection coupling said dual transaction control logic units, between said PCI read requests to said same PCI bus, reserving said same PCI bus for said one agent for said read request;

granting said read access to said same PCI bus for said one agent for said contiguous read operations; and maintaining said reservation for said one agent at said arbitration request connection until completion of said contiguous read operations.

2. The method of claim 1, wherein said reserving step comprises blocking said PCI read access to said PCI bus by said other said agent.

3. The method of claim 2, wherein said blocking step comprises preventing said other said agent from asserting its request lines at said PCI bus.

4. The method of claim 1, wherein said maintaining step additionally comprises establishing a byte count for said contiguous read operations; and wherein said completion of said contiguous read operations comprises transfer of data read at said PCI bus equaling said established byte count.

5. The method of claim 1, wherein said granting step additionally comprises providing a grant signal for allowing read access to said PCI bus.

6. The method of claim 5, wherein said maintaining step additionally comprises terminating said grant signal upon said completion of said contiguous read operations.

7. The method of claim 6, wherein said maintaining step additionally comprises, subsequent to said completion of said contiguous read operations, delaying any repeat of said read access by said one of said PCI agents, thereby allowing alternating access by said other of said PCI agents.

8. In a PCI bus system having at least one PCI bus, a PCI read access management system for managing read access between two agents providing PCI read requests to conduct contiguous read operations to a central resource at the same PCI bus, comprising:

dual transaction control logic units, each respectively coupled to a separate one of said agents; and an arbitration request connection coupling said dual transaction control logic units, such that a PCI read request by one of said agents recognized by one of said coupled dual transaction control logic units, is signaled to said arbitration request connection, said arbitration request connection arbitrating between said transaction control logic units for reserving said same PCI bus for said one agent, said one said transaction control logic unit granting said read access operation, and said one said transaction control logic unit maintaining said signal at said arbitration request connection, maintaining said reservation, until completion of said contiguous read operations.

9. The PCI read access management system of claim 8, wherein said dual transaction control logic units are additionally arranged such that said other said transaction control logic unit blocks said PCI read access to said PCI bus by said other said agent.

10. The PCI read access management system of claim 9, wherein said dual transaction control logic units are additionally arranged such that said other said transaction control logic unit prevents said other said agent from asserting its request lines at said PCI bus, thereby blocking said PCI read access to said PCI bus.

11. The PCI read access management system of claim 8, wherein said dual transaction control logic units are additionally arranged such that said one said transaction control logic unit additionally comprises a predetermined byte count for determining said completion of said contiguous read operations upon transfer of data read at said PCI bus equaling said established byte count.

12. The PCI read access management system of claim 8, wherein said arbitration request connection coupling additionally is arranged to provide a grant signal to said one transaction control logic unit to signal said one transaction control logic unit to reserve said PCI bus for said one agent, and wherein said dual transaction control logic units are arranged such that said one transaction control logic unit additionally signals a transaction control request for access to said PCI bus by said one agent.

13. The PCI read access management system of claim 12, wherein said dual transaction control logic units are additionally arranged such that said one transaction control logic unit responds to said completion of said contiguous read operations of said one agent, communicating with said arbitration request connection, said other transaction control logic unit terminating said grant signal.

14. The PCI read access management system of claim 13, wherein said dual transaction control logic units are additionally arranged such that said one transaction control logic unit responds to said completion of said contiguous read operations of said one agent, delaying any repeat of access by said one PCI agent, thereby allowing alternating access by said other PCI agent.

15. A PCI bus system for managing read access between two agents providing PCI read requests to conduct contiguous read operations to a central resource, said PCI bus system comprising:

a PCI bus coupled to said central resource;

dual transaction control logic units, each respectively coupled to a separate one of said agents, and coupled to the same said PCI bus; and an arbitration request connection coupling said dual transaction control logic units, such that a PCI read request by one of said agents recognized by one of said coupled dual transaction control logic units, is signaled to said arbitration request connection, said arbitration request connection arbitrating between said transaction control logic units for reserving said same PCI bus for said one agent, said one said transaction control logic unit granting said read access to said PCI bus for said one agent, and said one transaction control logic unit maintaining said signal at said arbitration request connection, maintain said reservation, until completion of said contiguous read operations.

16. The PCI bus system of claim 15, wherein said dual transaction control logic units are additionally arranged such that said other said transaction control logic unit blocks said PCI read access to said PCI bus by said other said agent.

17. The PCI bus system of claim 16, wherein said dual transaction control logic units are additionally arranged such that said other said transaction control logic unit prevents said other said agent from asserting its request lines at said PCI bus, thereby blocking said PCI read access to said PCI bus.

18. The PCI bus system of claim 15, wherein said dual transaction control logic units are additionally arranged such that said one said transaction control logic unit additionally comprises a predetermined byte count for determining said completion of said contiguous read operation upon transfer of data read at said PCI bus equaling said established byte count.

19. The PCI bus system of claim 15, wherein said arbitration request connection coupling additionally is arranged to provide a grant signal to said one transaction control logic unit to signal said one transaction control unit to reserve said PCI bus for said one agent, and wherein said dual transaction control logic units are arranged such that said one transaction control logic unit additionally signals a transaction control request for access to said PCI bus by said one agent.

20. The PCI bus system of claim 19, wherein said dual transaction control logic units are additionally arranged such that said one transaction control logic unit responds to said completion of said contiguous read operations of said one agent, communicating with said arbitration request connection, said other transaction control logic unit terminating said grant signal.

21. The PCI bus system of claim 20, wherein said dual transaction control logic units are additionally arranged such that said one transaction control logic unit responds to said completion of said contiguous read operations of said one agent, delaying any repeat of access by said one PCI agent, thereby allowing alternating access by said other PCI agent.

* * * * *

UNITED STATES PATENT AND TRADEMARK OFFICE
CERTIFICATE OF CORRECTION

PATENT NO.     : 6,557,087 B1                                        Page 1 of 1
DATED          : April 29, 2003
INVENTOR(S)    : Ellison et al.

It is certified that error appears in the above-identified patent and that said Letters Patent is hereby corrected as shown below:

Column 10,
Line 34, change "managemtn" to -- management --

Column 11,
Line 34, change "opeartion," to -- to said PCI bus for said one agent for said contiguous read operations, --

Signed and Sealed this

Twenty-eighth Day of October, 2003

JAMES E. ROGAN
*Director of the United States Patent and Trademark Office*